United States Patent
Tsuboi et al.

(10) Patent No.: US 8,022,344 B2
(45) Date of Patent: Sep. 20, 2011

(54) OPTICAL WAVEFRONT CONTROL PATTERN GENERATING APPARATUS AND OPTICAL WAVEFRONT CONTROL PATTERN GENERATING METHOD

(75) Inventors: Masashi Tsuboi, Yokosuka (JP); Tsutomu Horikoshi, Kamakura (JP)

(73) Assignee: NTT DoCoMo, Inc., Tokyo (JP)

( * ) Notice: Subject to any disclaimer, the term of this patent is extended or adjusted under 35 U.S.C. 154(b) by 758 days.

(21) Appl. No.: 11/587,637

(22) PCT Filed: Apr. 26, 2005

(86) PCT No.: PCT/JP2005/007920
§ 371 (c)(1),
(2), (4) Date: Jan. 25, 2008

(87) PCT Pub. No.: WO2005/103840
PCT Pub. Date: Nov. 3, 2005

(65) Prior Publication Data
US 2008/0246849 A1  Oct. 9, 2008

(30) Foreign Application Priority Data

Apr. 26, 2004 (JP) ................................ 2004-130243
Apr. 11, 2005 (JP) ................................ 2005-113419

(51) Int. Cl.
*G01J 1/20* (2006.01)
(52) U.S. Cl. ..................... 250/201.9; 250/550; 382/210; 382/211; 359/9
(58) Field of Classification Search ............... 250/201.9, 250/550; 382/310, 311, 210, 211; 359/9
See application file for complete search history.

(56) References Cited

U.S. PATENT DOCUMENTS

| 5,617,225 A | 4/1997 | Aritake et al. |
| 6,827,442 B2 * | 12/2004 | Ross et al. ..................... 351/205 |
| 2005/0151960 A1 * | 7/2005 | Gerwe et al. .................. 356/121 |

FOREIGN PATENT DOCUMENTS

| JP | 1 319085 | 12/1989 |
| JP | 1-319085 | 12/1989 |
| JP | 9 237029 | 9/1997 |

(Continued)

OTHER PUBLICATIONS

Björn Löfving, "Self-adjusting dynamic binary phase holograms", Applied Optics, vol. 36, No. 11, XP 000690741, Apr. 10, 1997, pp. 2347-2352.

(Continued)

*Primary Examiner* — Francis M Legasse, Jr.
(74) *Attorney, Agent, or Firm* — Oblon, Spivak, McClelland, Maier & Neustadt, L.L.P.

(57) ABSTRACT

An optical wavefront control pattern generating apparatus (1) relating to the present invention includes: a target image detector unit (60) configured to detect spatial information of the object (B) as a target image; a reconstructed image detector unit (40) configured to detect the reconstructed image displayed on the reconstructed image display unit (30); and an optimizer unit (50) configured to evaluate, on the basis of the target image detected by the target image detector unit (40), the reconstructed image detected by the reconstructed image detector unit (40), and to apply a modification process to the optical wavefront control pattern in a way that a result of the evaluation satisfies a predetermined condition, so as to generate the optimum optical wavefront control pattern.

8 Claims, 8 Drawing Sheets

FOREIGN PATENT DOCUMENTS

| | | |
|---|---|---|
| JP | 10 186283 | 7/1998 |
| JP | 10-186283 | 7/1998 |
| JP | 11 337733 | 12/1999 |
| JP | 11-337737 | 12/1999 |
| JP | 2004 37396 | 2/2004 |

OTHER PUBLICATIONS

Nobukazu Yoshikawa, et al., "Phase optimization of a kinoform by simulated annealing", Applied Optics, vol. 33, No. 5, XP 000429143, Feb. 10, 1994, pp. 863-868.

Sato, Kunihiro et al.,"Record of Holograms and Reconstruction of 3-Dimensional Moving Images", General Conference of the Institute of Electronics, Informations, and Communication Engineers, p. 164, 2004. (With English translation).

European Office Action dated Sep. 23, 2010 in corresponding European Application No. 05 737 165.

Japanese Office Action issued on Jan. 4, 2011, in Japanese Patent Application No. 2005-113419 (with English Translation).

Japanese Office Action issued on Jan. 4, 2011, in Japanese Patent Application No. 2005-113425 (with English Translation).

\* cited by examiner

FIG.3
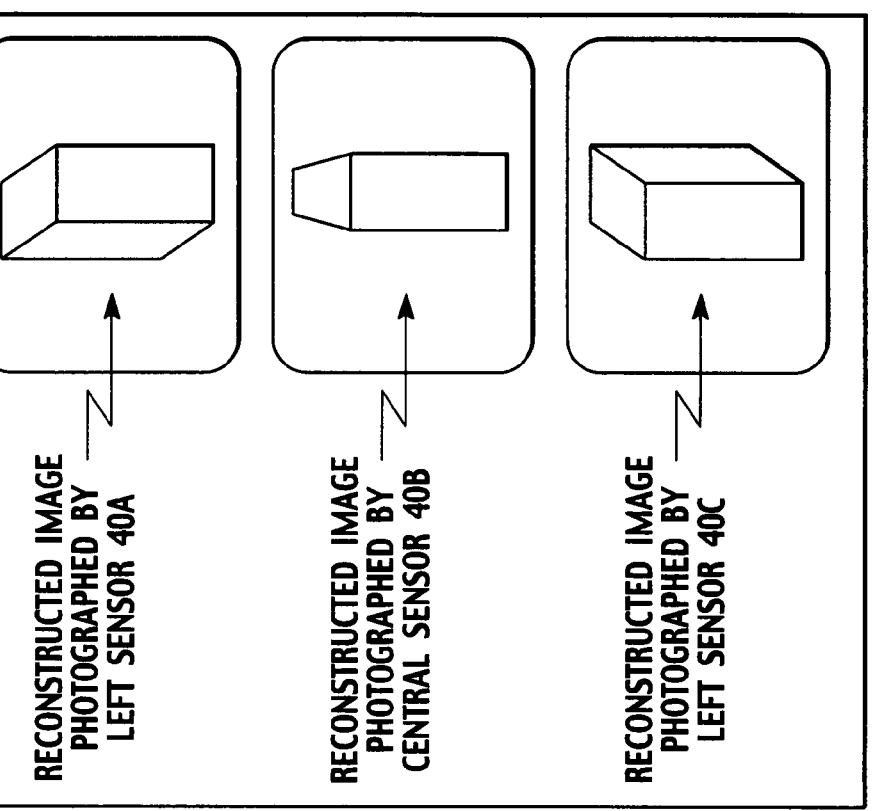
(a)
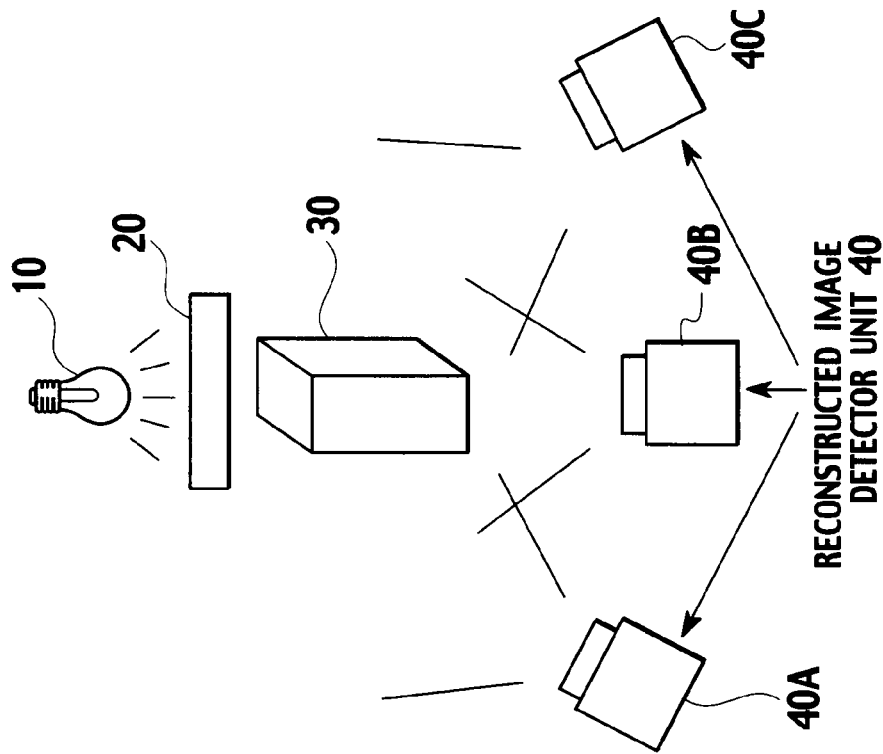
(b)

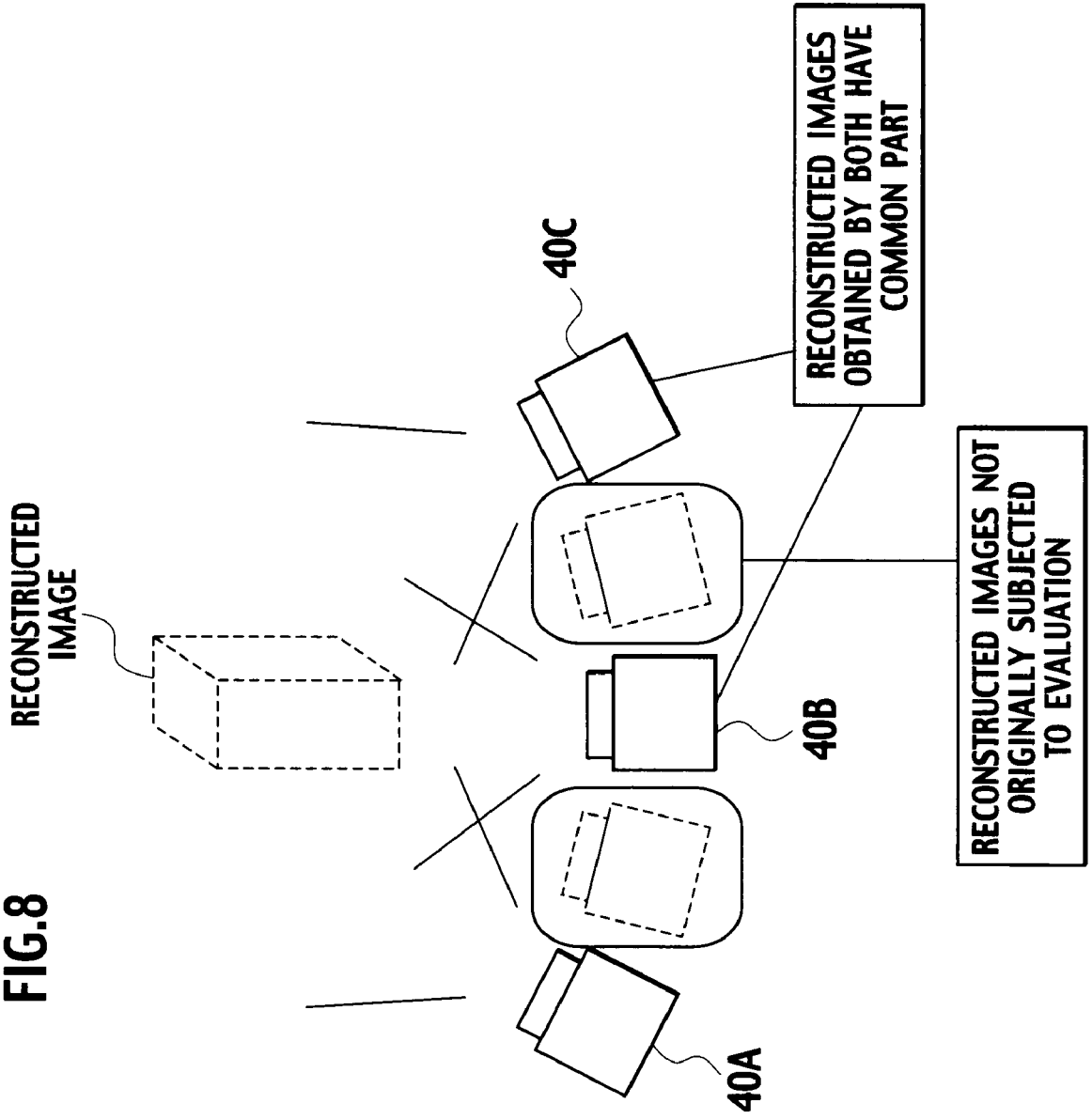

OPTICAL WAVEFRONT CONTROL PATTERN GENERATING APPARATUS AND OPTICAL WAVEFRONT CONTROL PATTERN GENERATING METHOD

TECHNICAL FIELD

The present invention relates to an optical wavefront control pattern generating apparatus and an optical wavefront control pattern generating method for generating an optimum optical wavefront control pattern, which is to be stored in an optical wavefront controller unit, in an image reconstruction system which displays a reconstructed image of an object on a reconstructed image display unit, by irradiating the optical wavefront controller unit, in which an optical wavefront control pattern is recorded, with illuminating light.

BACKGROUND ART

Conventionally, as a method and an apparatus for obtaining three-dimensional data (spatial information) indicating an external appearance of an object, a three-dimensional data obtaining apparatus disclosed in Patent Document 1 has been known. According to this three-dimensional data obtaining apparatus, it is possible to form virtual three-dimensional data of the object in a computer.

However, in the above three-dimensional data obtaining apparatus, attention is not given to displaying a stereoscopic image based on an obtained three-dimensional data of an object by using a three-dimensional image presentation technology such as computer holography. For this reason, in order to display a stereoscopic image based on an obtained three-dimensional data of an object, the above three-dimensional data obtaining apparatus needs to convert or calculate the three-dimensional data in compliance with a type and a display format of the stereoscopic image.

In order to generate a hologram for displaying a stereoscopic image of an object, technologies for recording interference fringes of light by using an image pick-up device, such as a CCD camera, are disclosed in Patent Document 2 and Non-patent Document 1.

The above technologies are configured to obtain interference fringes of light themselves by using an image pick-up device such as a CCD camera. Here, because a spatial resolution of a general CCD camera is about 5 μm, three-dimensional images, which can be obtained with the CCD camera, are limited to those within a viewing range of about 5 to 10 degrees.

For this reason, when a viewing range of a three-dimensional image intended to be reconstructed exceeds the viewing range of 5 to 10 degrees, the interference fringes of light is denser than the spatial resolution of the CCD camera. As a result, the interference fringes of light cannot be recorded with a good contrast.

That is, in each of the above technologies, there arise problems that angles, from which a stereoscopic image reconstructed by the generated hologram can be checked on, are limited, and that sizes of the respective stereoscopic images, which can be reconstructed, are limited.

In each of the above technologies, there is a problem that it is difficult to record the interference fringes of light with a simple apparatus or environment for the following reasons. A special light source, such as a laser, is necessary in order to secure coherence of a light source, and an influence, such as vibration, occurs considerably. As a result, it is necessary to apply a special treatment, such as a vibration control treatment, to an entire image reconstruction system.

(Patent Document 1) Japanese Patent Application No. 2004-37396
(Patent Document 2) Japanese Patent Application No. H9-237029
(Non-patent Document 1) Sato et al., "Recording Hologram and Reconstructing Three-dimensional Dynamic Image", the 2004 General Conference of the Institute of Electronics, Information and Communication Engineers As has been described above, in the conventional technologies, there are following problems. At the time when three-dimensional data is obtained, attention is not given to displaying a stereoscopic image (refer to Patent Document 1). As a result of attempting to directly obtain the interference fringes of light, the interference fringes of light cannot be obtained with a simple apparatus or environment because a high degree of precision of a device, coherence of a light source, a vibration control measure and the like are necessary (refer to Patent Document 2 and Non-patent Document 1).

DISCLOSURE OF THE INVENTION

Consequently, the present invention has been made in consideration of the above points. An object of the present invention is to provide an optical wavefront control pattern generating apparatus and an optical wavefront control pattern generating method, with which restrictions, such as a spatial resolution (a surface imagery), of an image pick-up device including a CCD camera can be reduced, and with which, without a need for a high-precision device but with a simple apparatus and environment, an optical wavefront control pattern used for displaying a stereoscopic image can be generated.

A first aspect of the present invention is summarized as an optical wavefront control pattern generating apparatus which generates an optimum optical wavefront control pattern which is to be stored in an optical wavefront controller unit, in an image reconstruction system displaying a reconstructed image of an object on a reconstructed image display unit, by irradiating the optical wavefront controller unit, in which an optical wavefront control pattern is recorded, with illuminating light, the apparatus includes: a target image detector unit configured to detect spatial information of the object as a target image; a reconstructed image detector unit configured to detect the reconstructed image displayed on the reconstructed image display unit; and an optimizer unit configured to evaluate, on the basis of the target image detected by the target image detector unit, the reconstructed image detected by the reconstructed image detector unit, and to apply a modification process to the optical wavefront control pattern in a way that a result of the evaluation satisfies a predetermined condition, so as to generate the optimum optical wavefront control pattern.

In the first aspect of the present invention, the target image detector unit can include a plurality of target image detection sensors with which the target image can be detected respectively from predetermined directions; the reconstructed image detector unit can include a plurality of reconstructed image detection sensors with which the reconstructed image can be detected respectively from predetermined directions, the reconstructed image being displayed on the reconstructed image display unit by the reconstruction light obtained by modulating at least any one of an amplitude and a phase of the illuminating light; and the optimizer unit can be configured to evaluate the reconstructed image, on the bases of a plurality of predetermined direction target images and a plurality of predetermined direction reconstructed images, the predetermined direction target images being detected by the plurality of target image detection sensors respectively from the predetermined directions, and the predetermined direction reconstructed images being detected by the plurality of reconstructed image detection sensors respectively from the predetermined directions.

In the first aspect of the present invention, a type and an arrangement of the plurality of target image detection sensors can be identical to those of the plurality of reconstructed image detection sensors.

In the first aspect of the present invention, the optimizer unit can be configured to evaluate the reconstructed image, on the bases of a type and an arrangement of the plurality of target image detection sensors and those of the plurality of reconstructed image detection sensors, and of the predetermined direction target images.

In the first aspect of the present invention, the optimizer unit can be configured to generate the optimum optical wavefront control pattern, by repeating application of a modification process to an optical wavefront control pattern, computation of an evaluation value of a reconstructed image of the optical wavefront control pattern to which the modification process has been applied, and determination, on the basis of the evaluation value, of whether or not the optical wavefront control pattern, to which the modification process has been applied, is to be adopted.

In the first aspect of the present invention, on the basis of difference information on evaluation values of reconstructed images respectively before and after the modification process, the optimizer unit can be configured to determine whether or not the optical wavefront control pattern, to which the modification process has been applied, is to be adopted.

In the first aspect of the present invention, on the basis of the difference information and an adoption probability determined by a repetitive parameter value, the optimizer unit can be configured to determine whether or not the optical wavefront control pattern, to which the modification process has been applied, is to be adopted.

In the first aspect of the present invention, the optimizer unit can be configured to repeat the modification process, the computation of the evaluation values, and the determination, until the evaluation values for the reconstructed image converge on a predetermined repetitive parameter value.

In the first aspect of the present invention, the optimizer unit can be configured to vary the predetermined repetitive parameter value within a predetermined range.

In the first aspect of the present invention, the optical wavefront controller can include an optical wavefront control device with which at least any one of an amplitude and a phase of the illuminating light can be modulated by use of the recorded optical wavefront control pattern.

A second aspect of the present invention is summarized as an optical wavefront control pattern generating method of generating an optimum optical wavefront control pattern which is to be stored in an optical wavefront controller unit, in an image reconstruction system for displaying a reconstructed image of an object on a reconstructed image display unit, by irradiating the optical wavefront controller unit, in which an optical wavefront control pattern is recorded, with illuminating light, the method includes: detecting spatial information of the object as a target image; detecting a reconstructed image displayed on the reconstructed image display unit; evaluating the detected reconstructed image on the basis of the detected target image; and generating the optimum optical wavefront control pattern, by applying a modification process to the optical wavefront control pattern in a way that a result of the evaluation satisfies a predetermined condition.

BRIEF DESCRIPTION OF THE DRAWINGS

FIGS. 3(a) and 3(b) are diagrams showing how a reconstructed image is detected in the optical wavefront control pattern generating apparatus according to the first embodiment of the present invention.

FIG. 8 is a diagram for explaining effects of the optical wavefront control pattern generating apparatus according to the first embodiment of the present invention.

BEST MODE FOR CARRYING OUT THE INVENTION

Configuration of Optical Wavefront Control Pattern Generating Apparatus According to a First Embodiment of the Present Invention With reference to FIGS. 1 to 5, descriptions will be provided for a configuration of an optical wavefront control pattern generating apparatus 1 according to a first embodiment of the present invention. By irradiating an optical wavefront controller unit 20, in which the optimum optical wavefront control pattern is recorded, with illuminating light 2, the optical wavefront control pattern generating apparatus 1 according to this embodiment generates the optimum optical wavefront control pattern, which is to be stored in the optical wavefront controller unit 20, in an image reconstruction system A for displaying a reconstructed image of an object B on a reconstructed image display unit 30.

Figure 1:
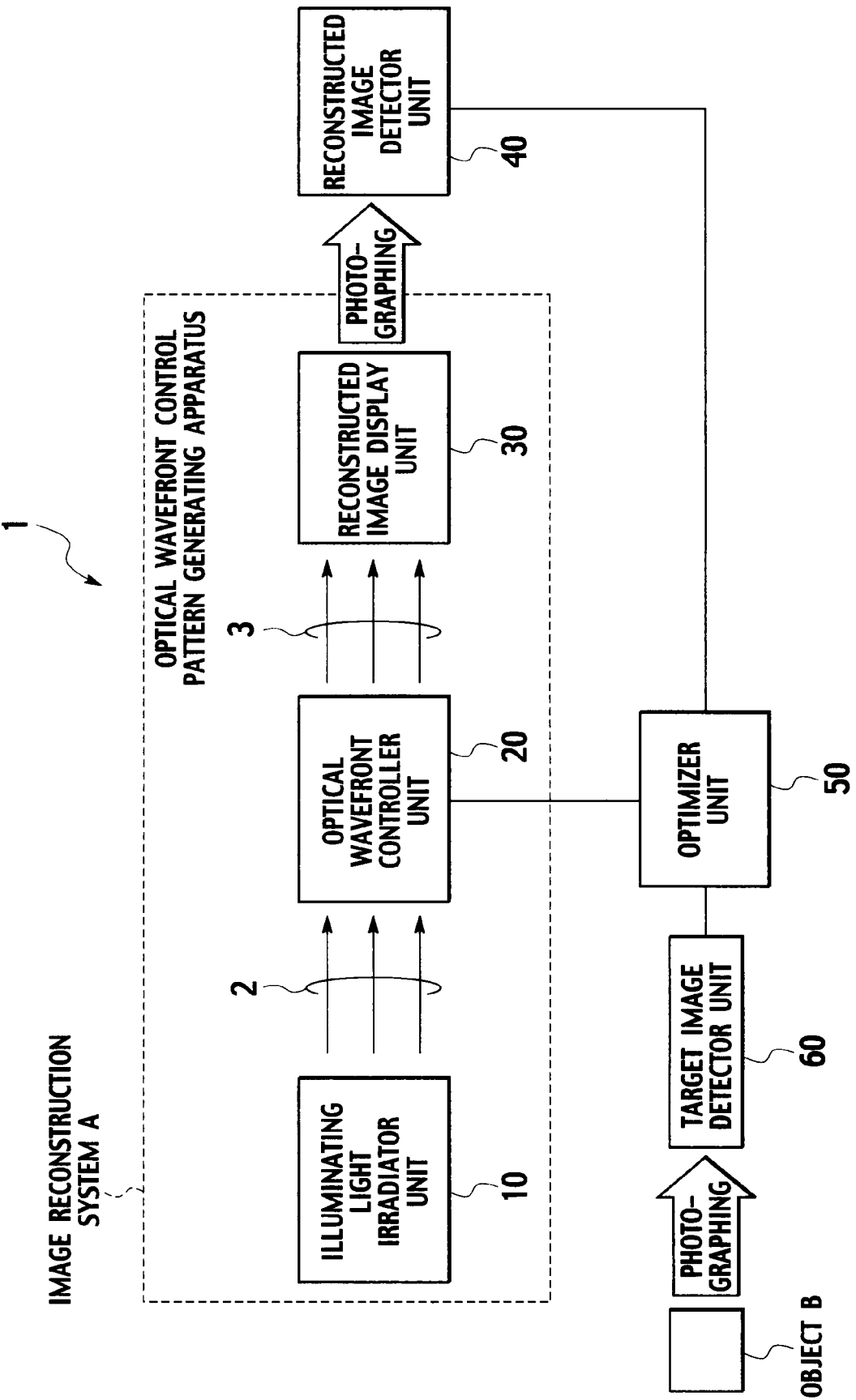
FIG. 1 is a functional block diagram of an optical wavefront control pattern generating apparatus according to a first embodiment of the present invention.
Figure 2:
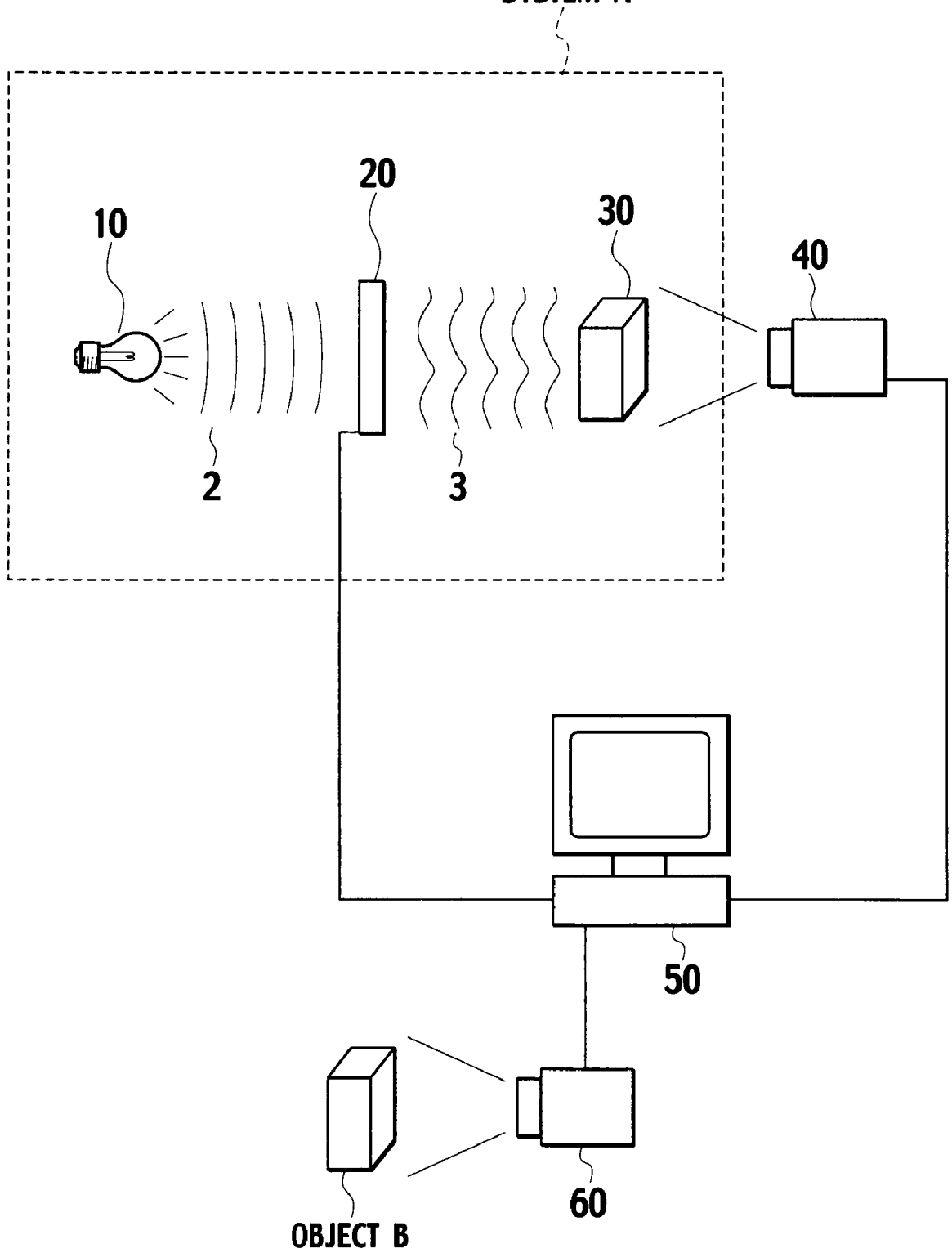
FIG. 2 is a model diagram of the optical wavefront control pattern generating apparatus according to the first embodiment of the present invention.
Figure 4:
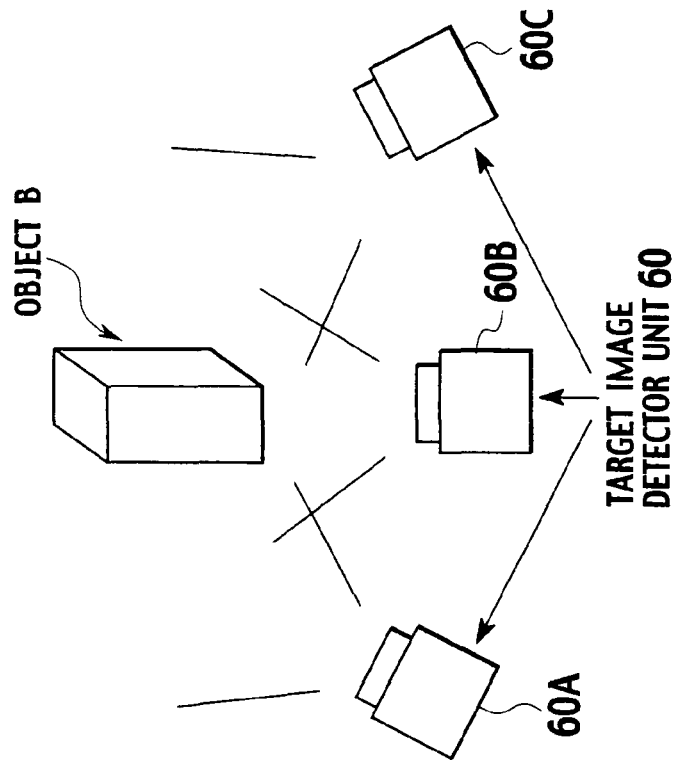
FIGS. 4(a) and 4(b) are diagrams showing how a target image is detected in the optical wavefront control pattern generating apparatus according to the first embodiment of the present invention.
Figure 4:
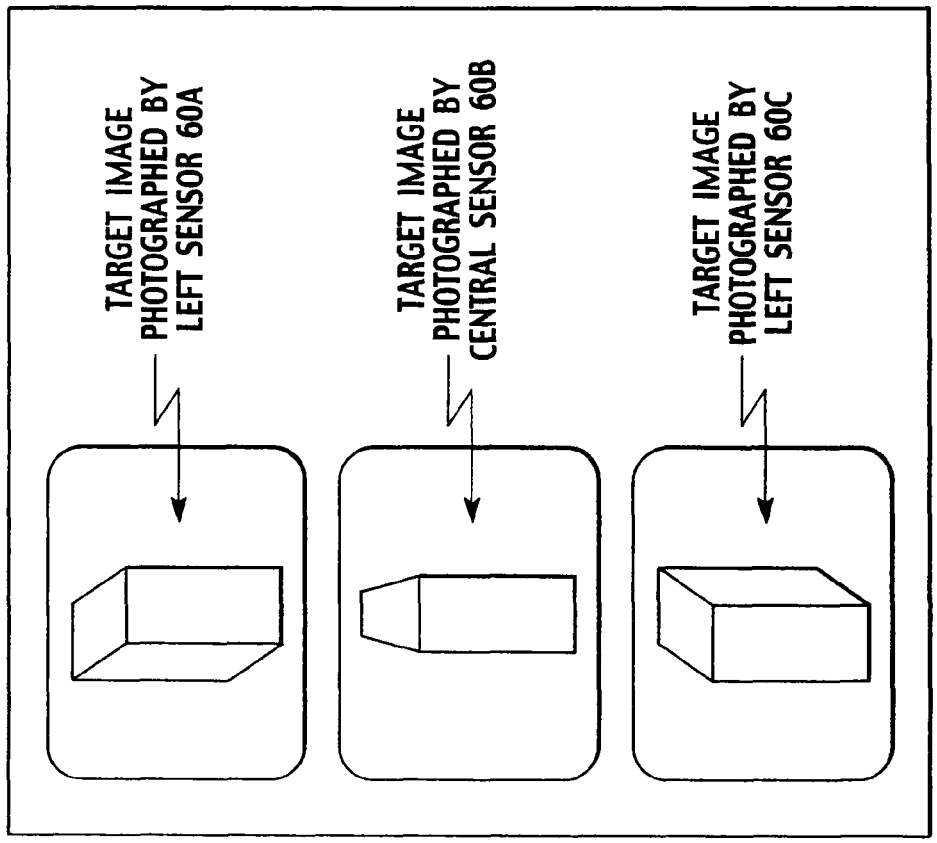

As shown in FIGS. 1 and 2, the optical wavefront control pattern generating apparatus 1 according to this embodiment includes an illuminating light irradiator unit 10, the optical wavefront controller unit 20, the reconstructed image display unit 30, a reconstructed image detector unit 40, an optimizer unit 50, and a target image detector unit 60.

The illuminating light irradiator unit 10 is configured to irradiate an optical wavefront control pattern (a hologram), which is displayed on an optical wavefront control device of the optical wavefront controller unit 20, with illuminating light.

The optical wavefront controller unit 20 is configured to record an optical wavefront control pattern transmitted from the optimizer unit 50, and is configured to then display the optical wavefront control pattern on the optical wavefront control device.

The reconstructed image display unit 30 is configured to display the reconstructed image, based on reconstruction light 3 propagated from the optical wavefront controller unit 20.

In the image reconstruction system A in the optical wavefront control pattern generating apparatus 1 according to this embodiment, at least any one of an amplitude and a phase of the illuminating light 2 irradiated from the illuminating light irradiator unit 10 is modulated by each pixel of the optical wavefront control pattern displayed on the optical wavefront control device. Thereby, the illuminating light 2 is converted into the reconstruction light 3. The reconstruction light 3 reaches the reconstructed image display unit 30 while changing traveling directions thereof, and thus the reconstructed image is displayed.

The reconstructed image detector unit 40 is configured to detect the reconstructed image displayed on the reconstructed image display unit 30. Specifically, the reconstructed image detector unit 40 includes a plurality of sensors (reconstructed image detection sensors) which make it possible to detect, respectively from predetermined directions, the reconstructed image displayed on the reconstructed image display unit 30 by the reconstruction light 3. The reconstruction light 3 is obtained by modulating at least any one of the amplitude and the phase of the illuminating light 2.

For example, in a case of using CCD cameras respectively as the reconstructed image detection sensors, the reconstructed image detector unit 40 photographs the reconstructed image displayed on the reconstructed image display unit 30 by means of the CCD cameras, and transmits, to the optimizer unit 50, reconstructed image data obtained by digitizing the photographed reconstructed image.

Specifically, as shown in FIG. 3(a), the reconstructed image detector unit 40 includes a left sensor 40A, a central sensor 40B, and a right sensor 40C. Accordingly, as shown in FIG. 3(b), the reconstructed image detector unit 40 makes it possible to obtain a plurality of reconstructed images (predetermined direction reconstructed images) photographed respectively from various directions (for example, a direction toward the left side, a direction toward the center, and a direction toward the right side, of the reconstructed image).

The target image detector unit 60 is configured to detect, as a target image, spatial information of the object B. Specifically, the target image detector unit 60 includes a plurality of sensors (target image detection sensors) which makes it possible to detect the above-described target image respectively from predetermined directions.

For example, in a case of using CCD cameras respectively as the target image detection sensors, the target image detector unit 60 photographs the spatial information of the object by means of the CCD cameras, and transmits, to the optimizer unit 50, target image data obtained by digitizing the photographed spatial information (the target image).

Specifically, as shown in FIG. 4(a), the target image detector unit 60 includes a left sensor 60A, a central sensor 60B, and a right sensor 60C. Accordingly, as shown in FIG. 4(b), the target image detector unit 60 makes it possible to obtain a plurality of target images (predetermined direction target images) photographed respectively from various directions (for example, a direction toward the left side, a direction toward the center, and a direction toward the right side, of the target image).

Note that the target image detection sensors (60A to 60C) are respectively sensors configured to obtain information which indicates an external appearance of an object existing in an actual space, and need not detect light. The target image detection sensors may be configured to obtain surface information of the object, by utilizing reflection of a laser, infrared rays, ultrasonic waves, or the like.

In this embodiment, a type and arrangement of the plurality of target image detection sensors (60A to 60C) may be identical to those of the plurality of reconstructed image detection sensors (40A to 40C). Alternatively, at least any one of a type and arrangement of the plurality of target image detection sensors (60A to 60C) and those of the plurality of reconstructed image detection sensors (40A to 40C) may be different from each other.

The optimizer unit 50 is configured to evaluate, on the basis of the target image detected by the target image detector unit 60, the reconstructed image detected by the reconstructed image detector unit 40, and to apply a modification process to the optical wavefront control pattern in a way that a result of the evaluation satisfies a predetermined condition. Thereafter, the optimizer unit 50 is configured to generate the optimum optical wavefront control pattern.

Specifically, the optimizer unit 50 is configured to evaluate the reconstructed image displayed on the reconstructed image display unit 30, on the bases of a plurality of predetermined direction target images and a plurality of predetermined direction reconstructed images. The predetermined direction target images are detected with the plurality of target image detection sensors (60A to 60C) respectively from the predetermined directions, and the predetermined direction reconstructed images are detected with the plurality of reconstructed image detection sensors (40A to 40C) respectively from the predetermined directions.

The optimizer unit 50 is configured to evaluate the reconstructed image, on the bases of the type and arrangement of the plurality of target image detection sensors (60A to 60C) and the plurality of reconstructed image detection sensors (40A to 40C), and of the predetermined direction target images.

That is, in a case where the type and arrangement of the plurality of target image detection sensors (60A to 60C) and the type and arrangement of the plurality of reconstructed image detection sensors (40A to 40C) are identical to each other, the optimizer unit 50 can evaluate the reconstructed image which is displayed on the reconstructed image display unit 30, by directly comparing the target image data with the reconstructed image data, the target image data and the reconstructed image data being respectively obtained from the plurality of target image detection sensors (60A to 60C) and from the plurality of reconstructed image detection sensors (40A to 40C).

As a result, it is made possible to reduce a computation time needed for the evaluation on the reconstructed image, quantization errors which may occur at the time of the computation, and other noise which may occur at the time of data conversion.

On the other hand, in a case where at least any one of a type and arrangement of the plurality of target image detection sensors (60A to 60C) and those of the plurality of reconstructed image detection sensors (40A to 40C) are different from each other, the optimizer unit 50 converts the target image data obtained from the plurality of target image detection sensors (60A to 60C) in a way that the target image data is made to be data as photographed under the same conditions (type and arrangement of the sensors, and the like) as those under which the reconstructed data are photographed. Then, the optimizer unit 50 evaluates the reconstructed image which is displayed on the reconstructed image display unit 30, by comparing the transformed target image data with the reconstructed image data.

The optimizer unit 50 is configured to generate the optimum optical wavefront control pattern, by using a repetitive optimization technique such as a "simulated annealing" method.

For example, the optimizer unit 50 may be configured to repeat the following processes to generate the optimum optical wavefront control pattern. A modification process (a Move operation) is applied to the optical wavefront control pattern (a solution before the Move operation). Thereafter, one of evaluation values E of a reconstructed image corresponding to the optical wavefront control pattern (a solution after the Move operation), to which the modification process (the Move operation) has been applied, is computed. Then, on the basis of the computed evaluation value E, it is determined whether or not the optical wavefront control pattern (the solution after the Move operation), to which the modification process (the Move operation) has been applied, is to be adopted.

The optimizer unit 50 may be configured to determine, on the basis of difference information ΔE of the evaluation values E of reconstructed images respectively before and after the modification process (the Move operation), whether or not the optical wavefront control pattern (the solution after the Move operation), to which the modification process (the Move operation) has been applied, is to be adopted.

The optimizer unit 50 may be configured to determine, on the basis of an adoption probability P defined with the difference information ΔE and a repetitive parameter value (a temperature parameter value T), whether or not the optical wavefront control pattern (the solution after the Move operation), to which the modification process (the Move operation) has been applied, is to be adopted.

The optimizer unit 50 may be configured to repeat computation of the evaluation value E and the above-described determination until the evaluation values E of the reconstructed image converge on a predetermined repetitive parameter value (temperature parameter value T).

The optimizer unit 50 may be configured to vary the above-described repetitive parameter value (the temperature parameter value T) within a predetermined range (a range from a sufficiently high temperature to a sufficiently low temperature). Here, the optimizer unit 50 may be configured to repeat the modification process (the Move operation), the computation of the evaluation value E, and the above-described determination until the evaluation values E of the reconstructed image converge on each of the repetitive parameter values (the temperature parameter values T) in the predetermined range.

Incidentally, the optimizer unit 50 may be configured to evaluate the reconstructed image which is displayed on the reconstructed image display unit 30, by comparing each of the plurality of predetermined direction target images, to a corresponding one of the plurality of predetermined direction reconstructed images s. The predetermined direction target images are detected with the plurality of target image detection sensors (60A to 60C) respectively from the predetermined directions, and the predetermined direction reconstructed images are detected with the plurality of reconstructed image detection sensors (40A to 40C) respectively from the predetermined directions.

That is, the optimizer unit 50 may be configured to generate the optimum optical wavefront control pattern, by applying a repetitive optimization technique to each of the predetermined direction target images, and to the predetermined direction reconstructed images.

Figure 5:
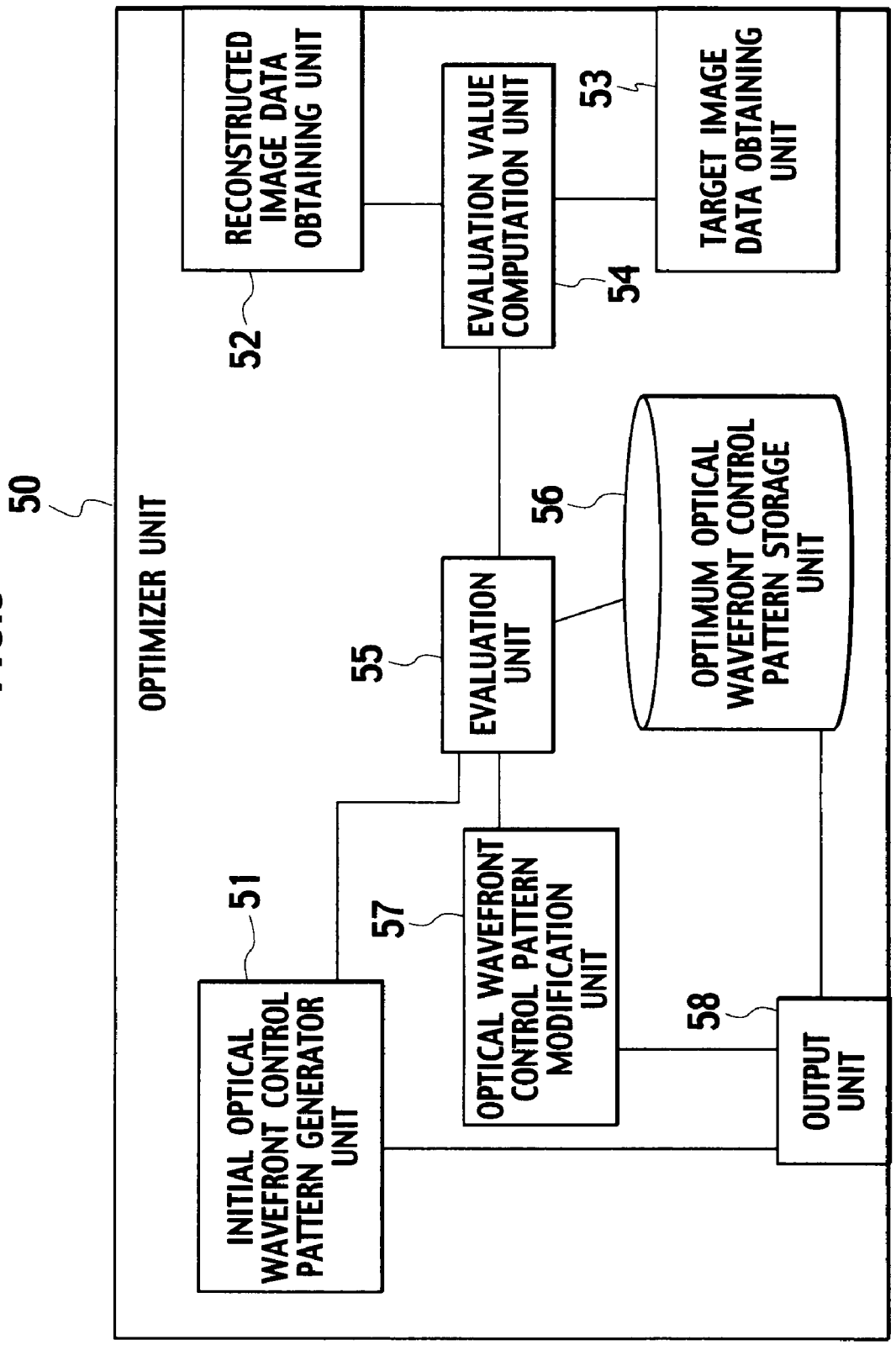
FIG. 5 is a functional block diagram of an optimizer unit of the optical wavefront control pattern generating apparatus according to the first embodiment of the present invention.

Specifically, as shown in FIG. 5, the optimizer unit 50 includes an initial optical wavefront control pattern generator unit 51, a reconstructed image obtaining unit 52, a target image data obtaining unit 53, an evaluation value computation unit 54, an evaluation unit 55, an optimum optical wavefront control pattern storage unit 56, an optical wavefront control pattern modification unit 57, and an output unit 58. Incidentally, specific functions of the respective units will be described later.

(Operations of Optical Wavefront Control Pattern Generating Apparatus According to this Embodiment)

Figure 6:
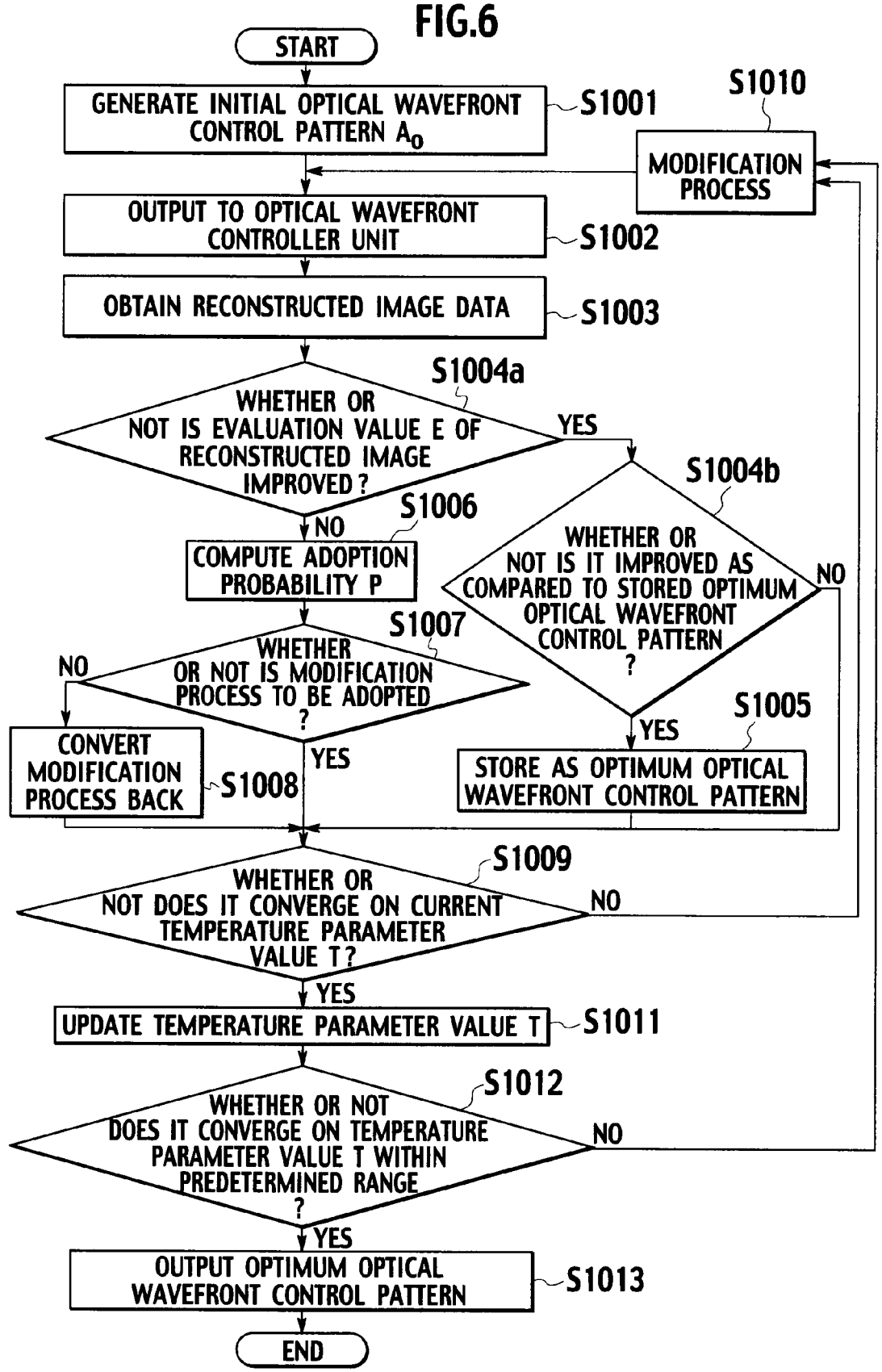
FIG. 6 is a flowchart showing operations of the optical wavefront control pattern generating apparatus according to the first embodiment of the present invention.
Figure 7:
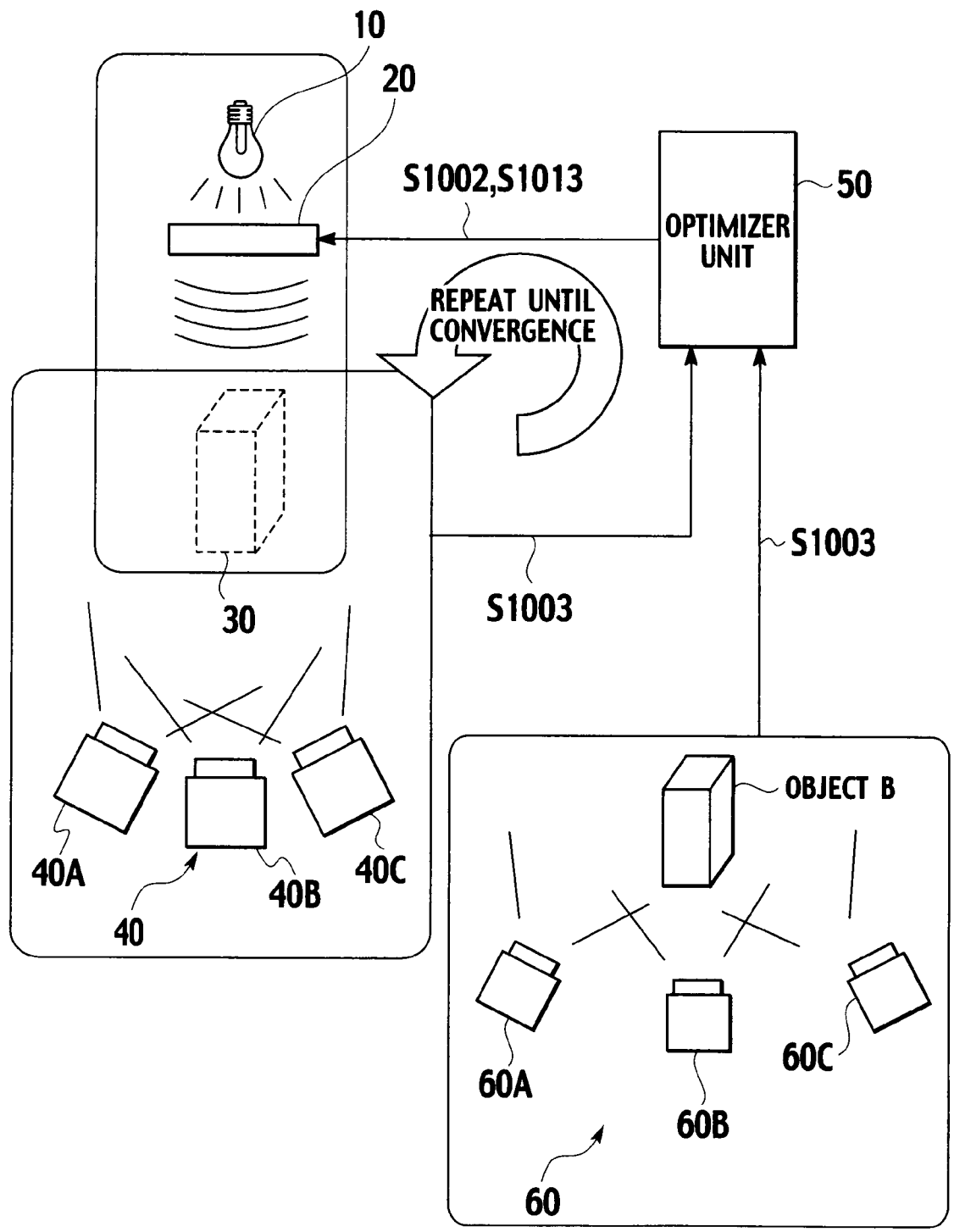
FIG. 7 is a diagram for explaining the operations of the optical wavefront control pattern generating apparatus according to the first embodiment of the present invention.

Referring to FIGS. 6 and 7, operations of the optical wavefront control pattern generating apparatus according to this embodiment will be described below.

Specifically, descriptions will be provided for operations in which, by using the "simulated annealing" method, the optimizer unit 50 of the optical wavefront control pattern generating apparatus according to this embodiment generates the optimum optical wavefront control pattern (a hologram) to be displayed on the optical wavefront control device of the optical wavefront controller unit 20, in order that a reconstructed image can be displayed on the reconstructed image display unit 30.

As shown in FIG. 6, in step S1001, the initial optical wavefront control pattern generator unit 51 of the optimizer unit 50 generates an initial optical wavefront control pattern (an initial solution of the optical wavefront control pattern) $A_0$.

For example, in a case of using a liquid crystal panel as the optical wavefront control device, and of using a method of displaying the reconstructed image by modulating an amplitude of the illuminating light 2 through a 256 tone grayscale image projected on the liquid crystal panel, the initial optical wavefront control pattern generator unit 51 generates the initial optical wavefront control pattern $A_0$ by assigning random values of 0 to 255 respectively to pixels of the grayscale image on the liquid crystal panel.

In a generation process (step S1001) of the initial optical wavefront control pattern $A_0$, when the number of the pixels is defined as "N", an amount of computation is expressed as "O(N)" because it is necessary to define values respectively for all of the pixels.

In this event, the initial optical wavefront control pattern $A_0$ need not be a random value. The reason is as follows. Nearly 100% of the Move operations which worsen solutions are adopted in a high-temperature state (a state where the temperature parameter value T is large) at the time immediately after an experiment starts regardless of the magnitude of a value taken for the initial optical wavefront control pattern $A_0$. Thus, by sufficiently performing computations by the "simulated annealing" method in a sufficiently high-temperature state, the same effect as in the case of generating a random initial solution can be obtained, and a performance of a solution which can be finally obtained is not deteriorated.

In step S1002, the output unit 58 of the optimizer unit 50 outputs, to the optical wavefront controller unit 20, the initial optical wavefront control pattern $A_0$ generated by the initial optical wavefront control pattern generator unit 51.

Moreover, in step S1002, the output unit 58 of the optimizer unit 50 outputs, to the optical wavefront controller unit 20, an initial optical wavefront control pattern $A_1$ modified by the optical wavefront control pattern modification unit 57.

In step S1003, the illuminating light 2 irradiated by the illuminating light irradiator unit 10 is modulated to be reconstruction light 2 by the optical wavefront control pattern ($A_0$ or $A_1$) displayed on the optical wavefront control device of the optical wavefront controller unit 20. Then, the reconstructed image display unit 30 displays the reconstructed image on the basis of the reconstruction light 2.

Thereafter, the reconstructed image detector unit 40 photographs the reconstructed image from various directions (three directions in an example of FIG. 7) by means of the respective plurality of reconstructed image detection sensors (a left camera 40A, a central camera 40B, and a right camera 40C in the example of FIG. 7), and digitizes the plurality (three in the example of FIG. 7) of photographed reconstructed images. After that, the reconstructed image obtaining unit 52 of the optimizer unit 50 obtains, from the respective reconstructed image detection sensors composing the reconstructed image detector unit 40, the plurality (three in the example of FIG. 7) of digitized reconstructed images.

The target image detector unit 60 photographs the object B from various directions (three directions in the example of FIG. 7) by means of the respective plurality of target image detection sensors (a left camera 60A, a central camera 60B, and a right camera 60C in the example of FIG. 7), and digitizes the plurality (three in the example of FIG. 7) of photographed target images. Thereafter, the target image obtaining unit 53 of the optimizer unit 50 obtains, from the respective target image detection sensors composing the target image detector 60, the plurality (three in the example of FIG. 7) of digitized target images.

In this embodiment, the target image detection sensors 60A to 60C, which photograph the respective target images, are used under the same conditions (kind, arrangement, settings and the like) as those used for the reconstructed image detection sensors 40A to 40C which photograph the respective reconstructed images.

In step S1004*a*, the evaluation value computation unit 54 of the optimizer unit 50 compares each of the obtained target images with a corresponding one of the obtained reconstructed images, and calculates the evaluation value E (an evaluation value $E_0$ of the reconstructed image corresponding to the initial optical wavefront control pattern $A_0$) indicating how close the reconstructed image displayed on the reconstructed image display unit 30 is to the target image.

For example, the evaluation value computation unit 54 may be configured to compute the evaluation value E by taking an absolute value of a difference between a light intensity of the target image at each of coordinate points and a light intensity of the reconstructed image at each of the coordinate points, and then by adding up the absolute values respectively for all of the coordinate points. In this case, in the target image data and the reconstructed image data, brightness of light of the target image and that of the reconstructed image at the coordinate points in each of the images are digitized, and then recorded, for example, respectively with values of 256 tones.

Specifically, the evaluation value computation unit 54 can compute a difference between each of the reconstructed image data and one of the target image data for the plurality of reconstructed image data and for the plurality of target image data. A total of these differences can be set as the evaluation value E. That is, in a case where the evaluation value E is "0", it means that the reconstructed image perfectly matches with the target image. In a case where the evaluation value E is large, it means that the reconstructed image and the target image are different from each other to a large extent.

In this embodiment, since the target image detection sensors 60A to 60C and the reconstructed image detection sensors 40A to 40C are all used under the same conditions, the evaluation value computation unit 54 can compute the above-described evaluation value without modifying the plurality of reconstructed image data and the plurality of target image data.

On the other hand, in a case where the target image detection sensors 60A to 60C and the reconstructed image detection sensors 40A to 40C are used under different conditions from those of one another, the evaluation value computation unit 54 needs to convert the target image data, obtained from the plurality of target image detection sensors (60A to 60C), so that the target image data can be made into data as photographed under the same conditions (type and arrangement of the sensors, and the like) as those for the reconstructed image data.

That is, in a case where CCD cameras are used respectively as the reconstructed image detection sensors while infrared ray sensors are used as the target image detection sensors, the evaluation value computation unit 54 needs to convert the target image data by use of a predetermined method in order to compute the evaluation value E of the reconstructed image.

In this case, for example, the evaluation value computation unit 54 hypothetically generates a three-dimensional spatial model on the basis of the obtained target image data, and computes data supposed to be outputted in a case of measuring the generated three-dimensional spatial model by use of the reconstructed image detection sensors. Then, the evaluation value computation unit 54 can perform the above-described evaluation on the reconstructed image by evaluating, on the basis of the computed data, the reconstructed image data obtained from the reconstructed image detection sensors.

The evaluation unit 55 of the optimizer unit 50 determines, on the basis of the computed evaluation value E of the reconstructed image, whether or not an optical wavefront control pattern corresponding to the above reconstructed image is improved. In a case where it is determined that the optical wavefront control pattern is improved (in a case of "Yes" in step S1004*a*), the operation proceeds to step S1004*b*. In a case where it is determined that it is not improved (in a case of "No" in step S1004*a*), the operation proceeds to step S1006.

For example, the evaluation unit 55 computes difference information $\Delta E = E(A_j) - E(A_{j+1})$ of the evaluation values of the reconstructed images respectively before and after the modification process to the optical wavefront control pattern. In a case where $\Delta E < 0$ is true, the evaluation unit 55 evaluates that the optical wavefront control pattern $A_j$ is improved. In a case where $\Delta E < 0$ is not true, the evaluation unit 55 evaluates that the optical wavefront control pattern $A_j$ is worsen.

In step S1004*b*, the evaluation unit 55 determines whether or not the optical wavefront control pattern $A_j$ is improved as compared to the optimum optical wavefront control pattern stored in the optimum optical wavefront control pattern storage unit 56. In a case where it is determined that the optical wavefront control pattern $A_j$ is improved (in a case of "Yes" in step S1004*b*), the operation proceeds to step S1005. In a case where it is determined that it is not improved (in a case of "No" in step S1004*b*), the operation proceeds to step S1009.

In step S1005, the evaluation unit 55 stores the above optical wavefront control pattern $A_j$, as the optimum optical wavefront control pattern, in the optimum optical wavefront control pattern storage unit 56.

That is, in step S1005, the evaluation unit 55 determines that the above optical wavefront control pattern $A_j$ is to be adopted as the optimum optical wavefront pattern in a range searched so far.

Incidentally, the evaluation unit 55 stores the initial optical wavefront control pattern $A_0$, as the optimum optical wavefront pattern, in the optimum optical wavefront control pattern storage unit 56 without making the above described determination.

On the other hand, in step S1006, the evaluation unit 55 computes an adoption probability P by using equation (1). The adoption probability P indicates a probability of adopting a local modification process (the Move operation) by which the optical wavefront control pattern $A_j$ is computed.

$$P = \exp(-\Delta E/T) \quad \text{equation (1)}$$

Here, T denotes a temperature parameter value.

In step S1007, on the basis of the computed adoption probability P, the evaluation unit 55 determines whether or not the local modification process, by which the optical wavefront control pattern $A_j$ is computed, is to be adopted.

The evaluation unit 55 performs an operation in step S1009 in a case where it is determined that the above local modification process is to be adopted. The evaluation unit 55 performs an operation in step S1008 in a case where it is determined that the above local modification process is not to be adopted.

In step S1008, an optical wavefront control pattern modification unit 46 converts the optical wavefront control pattern $A_j$ back to the optical wavefront control pattern $A_{j-1}$ which is in a state prior to the above-described local modification process.

In step S1009, the evaluation unit 55 determines whether or not evaluation values $E_j$ of a reconstructed image corresponding to the optical wavefront control pattern $A_j$ converge on the current temperature parameter value T.

Specifically, when computing the optical wavefront control pattern $A_j$ based on the temperature parameter value T, the evaluation unit 55 determines whether or not a sufficient number of times of the local modification processes are previously performed. Incidentally, this determination is made with the same method as that used for a determination made with the conventional "simulated annealing" method.

The evaluation unit 55 performs an operation in step S1101 in a case where it is determined that the evaluation values $E_j$ of the above reconstructed image converge. The evaluation unit 55 performs an operation in step S1010 in a case where it is determined that the evaluation values $E_j$ of the above reconstructed image do not converge.

In step S1011, the evaluation unit 55 updates the temperature parameter value T. For example, when temperature is divided in units of "a", an updated temperature parameter value $T_{new}$ is computed by "$T_{new} = a \times T_{old}$".

In step S1012, the evaluation unit 55 determines whether or not evaluation values $E_j$ of a reconstructed image corresponding to the optical wavefront control pattern $A_j$ converge on the temperature parameter value T within a predetermined range (of surrounding temperatures).

Specifically, the evaluation unit 55 determines whether or not the temperature parameter value T has dropped to a sufficiently low value, i.e., whether or not a sufficient number of times of the local modification processes have been performed. Incidentally, this determination is made with the same method as that used for a determination made with the conventional "simulated annealing" method.

The operation proceeds to step S1013, in a case where it is determined that a sufficient number of times of the local modification processes have been performed. The operation proceeds to step S1010, in a case where it is determined that a sufficient number of times of the local modification processes have not been performed.

In step S1010, the optical wavefront control pattern modification unit 46 of the optimizer unit 50 applies the local modification process to the above optical wavefront control pattern $A_j$.

Here, the local modification process can be defined as a process in which a value for one randomly selected pixel out of N×M pixels respectively corresponding to those of the grayscale image on the above described liquid crystal panel is modified into a random value between 0 and 255. With the above local modification process, a minute change is seen in the reconstructed image.

In step S1013, the output unit 58 of the optimizer unit 50 outputs, as the optimum optical wavefront control pattern, an optical wavefront control pattern stored in the optimum optical wavefront control pattern storage unit 56.

With the repetitive operations which uses the temperature parameter value T, and which are performed in the above described manner, it is made possible to avoid incurring a local optimum solution when the optimum optical wavefront control pattern is computed.

Here, in order to search sufficiently for a solution, the temperature parameter value T should be updated, with sufficiently minute intervals (temperature steps), at points starting from a sufficiently high value (starting temperature) to a sufficiently low value (ending temperature). The updating should take a sufficiently long period of time (for a sufficient number of times of: the local modification processes respectively with the temperature parameter values T; evaluation; and determination of adoption, i.e., the number of times of trials).

The evaluation unit 55 needs to set the starting temperature in a sufficiently high-temperature state (a temperature at which the adoption probability is nearly "1" regardless of the magnitude the evaluation value modified with the local modification process), to set the ending temperature in a sufficiently low-temperature state (a temperature at which all of worsening operations are not adopted), and to set the temperature steps and the number of times of trials respectively at appropriate values in accordance with a magnitude of an issue (which corresponds to a resolution of optical control patterns, to the number of grayscale tones, and to a size of a space in which the reconstructed image is displayed).

Incidentally, in order to reduce a computation time when performing the evaluation of the reconstructed image, the evaluation value computation unit 54 may be configured to compute evaluation values with respect to parts in which changes in the reconstructed image have occurred as a result of applying the local modification processes. The evaluation unit 55 may be configured to perform the evaluation on the reconstructed image by using difference information $\Delta E$ of the above evaluation values.

The reason for the above is that parts of the reconstructed image, which have not changed even after applying the local modification processes, do not influence difference information $\Delta E$ of evaluation values respectively before and after the local modification processes.

(Actions and Effects of Optical Wavefront Control Pattern Generating Apparatus According to this Embodiment)

An optical wavefront control pattern generating apparatus according to this embodiment is configured to optimize an optical wavefront control pattern (hologram) by directly comparing spatial information (a target image) of an object B detected by target image detection sensors with a reconstructed image photographed by the reconstructed image detection sensors. Thus, restrictions, such as a spatial resolution (a surface imagery), of sensors, can be reduced as compared to those with a method in which interference fringes of light are directly obtained with a CCD camera or the like.

With the optical wavefront control pattern generating apparatus according to this embodiment, in a case where target image detection sensors and reconstructed image detection sensors are all used under the same conditions, the conversion of target image data for the purpose of matching target image data with reconstructed image data is not necessary. Hence, the computation time can be reduced.

With the optical wavefront control pattern generating apparatus according to this embodiment, the optimum optical wavefront control pattern is generated by repeatedly application of an optimization technique to each of the plurality of target image data and to each of the plurality of reconstructed image data. Accordingly, optimization can be promoted also with respect to a part (an intermediate image) which has not been obtained by the target image detection sensors and the reconstructed image detection sensors. In addition, a continuous stereoscopic image observable from a larger number of angles can be expressed as compared to a conventional stereoscopic view and a multiple-eye view.

Specifically, as shown in FIG. 8, the optical wavefront control pattern generating apparatus according to this embodiment makes it possible to optimize "intermediate images" which have not been actually subjected to the evaluation.

For example, as shown in FIG. 8, in a case where a plurality of reconstructed images are obtained by using the plurality of reconstructed image detection sensors 40A to 40C, the optical wavefront control pattern generating apparatus according to this embodiment is configured to obtain the plurality of reconstructed images with the plurality of reconstructed image detection sensors 40A to 40C arranged in positions at the respective observation points which are different from one another.

Here, common information is included in reconstructed images obtained respectively with two of the reconstructed image detection sensors. For this reason, by optimizing both of the reconstructed images obtained respectively with the two adjacent reconstructed image detection sensors, reconstructed images (intermediate images) obtained from the positions at the respective observation points, which are not originally subjected to the evaluation, are also optimized as reconstructed images having information which is common to the two adjacent reconstructed image detection sensors.

As a result, the intermediate images can be continuously optimized unlike a conventional stereoscopic view which is a mainstream of conventional methods of obtaining information with a plurality of CCD cameras to display the information.

INDUSTRIAL APPLICABILITY

As has been described hereinabove, according to the present invention, it is made possible to provide an optical wavefront control pattern generating apparatus and an optical wavefront control pattern generating method with which restrictions, such as a spatial resolution (a surface imagery), of an image pick-up device such as a CCD camera can be reduced, and with which, without requiring a high-precision device but with a simple apparatus and environment, an optical wavefront control pattern used for displaying a stereoscopic image can be generated.

The invention claimed is:

1. An optical wavefront control pattern generating apparatus which generates an optimum optical wavefront control pattern which is to be stored in an optical wavefront controller unit, in an image reconstruction system displaying a reconstructed image of an object on a reconstructed image display unit, by irradiating the optical wavefront controller unit, in which an optical wavefront control pattern is recorded, with illuminating light, the apparatus comprising:
a target image detector unit configured to detect spatial information of the object as a target image;
a reconstructed image detector unit configured to detect the reconstructed image displayed by the reconstructed image display unit; and
an optimizer unit configured to evaluate, on the basis of the target image detected by the target image detector unit, the reconstructed image detected by the reconstructed image detector unit, and to apply a modification process to the optical wavefront control pattern to satisfy a predetermined condition, so as to generate the optimum optical wavefront control pattern,
wherein the optimizer unit is configured to generate the optimum optical wavefront control pattern, by repeating application of a modification process to an optical wavefront control pattern, computation of an evaluation value of a reconstructed image of the optical wavefront control pattern to which the modification process has been applied, and determination, on the basis of the evaluation value, of whether or not the optical wavefront control pattern, to which the modification process has been applied, is to be adopted;
on the basis of difference information on evaluation values of reconstructed images respectively before and after the modification process, the optimizer unit is configured to determine whether or not the optical wavefront control pattern, to which the modification process has been applied, is to be adopted; and
on the basis of the difference information and an adoption probability determined by a repetitive parameter value, the optimizer unit is configured to determine whether or not the optical wavefront control pattern, to which the modification process has been applied, is to be adopted.

2. The optical wavefront control pattern generating apparatus according to claim 1, wherein:
the target image detector unit comprises a plurality of target image detection sensors with which the target image can be detected respectively from predetermined directions;
the reconstructed image detector unit comprises a plurality of reconstructed image detection sensors with which the reconstructed image can be detected respectively from predetermined directions, the reconstructed image being displayed on the reconstructed image display unit by the reconstruction light obtained by modulating at least any one of an amplitude and a phase of the illuminating light; and
the optimizer unit is configured to evaluate the reconstructed image, on the bases of a plurality of predetermined direction target images and a plurality of predetermined direction images from the reconstructed image detector unit, the predetermined direction target images being detected by the plurality of target image detection sensors respectively from the predetermined directions, and the predetermined direction images being detected by the plurality of reconstructed image detection sensors respectively from the predetermined directions.

3. The optical wavefront control pattern generating apparatus according to claim 1, wherein:
the optimizer unit is configured to repeat the modification process, the computation of the evaluation values, and the determination, until the evaluation values for the reconstructed image converge on a predetermined repetitive parameter value.

4. The optical wavefront control pattern generating apparatus according to claim 1, wherein:
the optical wavefront controller comprises an optical wavefront control device with which at least any one of an amplitude and a phase of the illuminating light can be modulated by use of the recorded optical wavefront control pattern.

5. The optical wavefront control pattern generating apparatus according to claim 2, wherein:
a type and an arrangement of the plurality of target image detection sensors are identical to those of the plurality of reconstructed image detection sensors.

6. The optical wavefront control pattern generating apparatus according to claim 2, wherein:
the optimizer unit is configured to evaluate the reconstructed image, on the bases of a type and an arrangement of the plurality of target image detection sensors and those of the plurality of reconstructed image detection sensors, and of the predetermined direction target images.

7. The optical wavefront control pattern generating apparatus according to claim 3, wherein:
the optimizer unit is configured to vary the predetermined repetitive parameter value within a predetermined range.

8. An optical wavefront control pattern generating method of generating an optimum optical wavefront control pattern which is to be stored in an optical wavefront controller unit, in an image reconstruction system for displaying a reconstructed image of an object on a reconstructed image display unit, by irradiating the optical wavefront controller unit, in which an optical wavefront control pattern is recorded, with illuminating light, the method comprising:
detecting spatial information of the object as a target image;
detecting a reconstructed image displayed by the reconstructed image display unit;
evaluating the detected reconstructed image on the basis of the detected target image; and
generating the optimum optical wavefront control pattern, by applying a modification process to the optical wavefront control pattern to satisfy a predetermined condition,
wherein the generating the optimum optical wavefront control pattern further includes:
generating the optimum optical wavefront control pattern, by repeating application of a modification process to an optical wavefront control pattern, computing an evaluation value of a reconstructed image of the optical wavefront control pattern to which the modification process has been applied, and determining, on the basis of the evaluation value, whether or not the optical wavefront control pattern, to which the modification process has been applied, is to be adopted;
on the basis of difference information on evaluation values of reconstructed images respectively before and after the modification process, determining whether or not the optical wavefront control pattern, to which the modification process has been applied, is to be adopted; and
on the basis of the difference information and an adoption probability determined by a repetitive parameter value, determining whether or not the optical wavefront control pattern, to which the modification process has been applied, is to be adopted.

* * * * *